INVENTORS:
HOWARD E. BERNHARDT
KENNETH W. DAVEY
BY Andrus & Scales
ATTORNEYS.

United States Patent Office 2,780,717
Patented Feb. 5, 1957

2,780,717

METHOD OF WELDING

Howard E. Bernhardt, Milwaukee, and Kenneth W. Davey, Wauwatosa, Wis., assignors to A. O. Smith Corporation, Milwaukee, Wis., a corporation of New York Application February 26, 1954, Serial No. 412,685

6 Claims. (Cl. 219—100)

This invention relates to a method of welding and more particularly to flash welding wherein an expendible cast die is used to rapidly support the articles in alignment during the welding operation.

During flash welding the pieces to be welded are each held rigidly within a metal die which is formed to the contour of the piece so that the pieces will not move during the impact of flash welding. Usually the dies are machined to obtain the proper contour. Not only is the machining a very expensive operation, but the pieces to be welded are never absolutely identical in shape so that there are variances between the contour of the piece and the complementary die. These variances between the piece and the die tend to permit movement of the piece during welding with a resulting loss of welding tolerance.

In the past, when experiments were performed for the purpose of testing flash welded members, it was necessary to machine the dies which were required to hold the pieces during flash welding. If the test welded members proved unsatisfactory, the dies were then useless and the cost of machining the same was wasted.

The present invention is directed to a simple and inexpensive method of producing dies for flash welding which eliminates machining. According to the invention, the pieces to be welded are each properly aligned in a mold box. A low melting point metal is then cast around the pieces so that the edges of the pieces to be flash welded project from the cast metal. The castings and the pieces are then removed from the mold boxes and each casting serves as a die which rigidly hold the pieces during flash welding.

After flash welding, the welded pieces and the attached metal dies are heated to a temperature sufficient to melt the alloy. The alloy is melted away from the welded piece, and the molten metal is collected for subsequent re-use in the flash welding of other pieces.

By this method of flash welding, expensive machine operations on the dies are eliminated so that flash welding tests and small flash welding production runs are economically feasible.

The present method results in better welds because the pieces are held rigidly within the dies and there can be no relative movement between the piece and the die during the impact of flash welding.

In addition, as the cast metal die substantially surrounds the piece and is a relatively good conductor of electricity, the electrical leads for flash welding can be attached directly to the dies and this eliminates the use of copper conductor bars.

The drawing furnished herewith illustrates the best mode of carrying out the invention as presently contemplated and set forth hereinafter.

Figure 1:
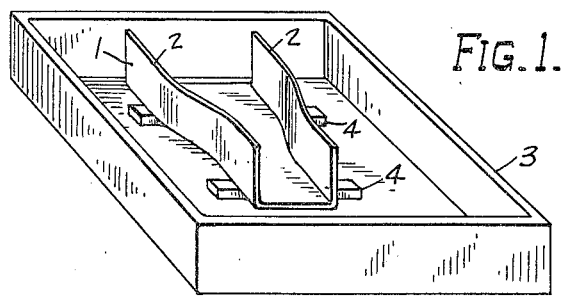
Figure 1 is a perspective view showing the member to be welded aligned within a mold box.

The drawing illustrates a method of flash welding two metal members 1 together. The members shown in the drawing are generally channel shaped, such as air-frame components, with the edges 2 of one member adapted to be welded to the complementary edges of a corresponding member to form a generally tubular article.

Each of the members 1 is placed in a mold box 3 with the open end of the member facing upwardly. The member is spaced from the bottom of the box 3 by a plurality of spacers 4.

Figure 2:
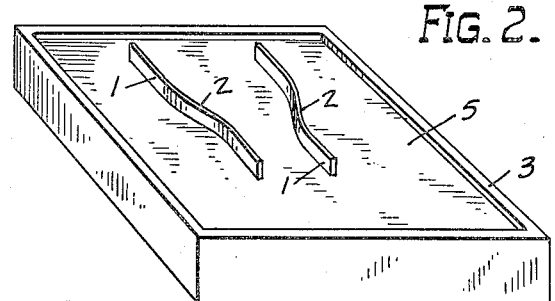
Fig. 2 is a perspective view showing the member within the mold box after the alloy has been cast therearound.

A molten, low melting point metal is cast around the member 1 to form a die 5. The thickness of die 5 is such that the edges 2 project a slight distance outwardly of the surface of the die 5, as shown in Fig. 2. The distance that the edges 2 project outwardly of die 5 is determined by the particular welding operation and depends on the gauge and type of metal of the member 1, the current to be employed, etc. Generally for most operations, the edges 2 will project from ¾ to 1½ inches from the surface of die 5.

The metal of die 5 should have a low melting point substantially beneath the melting point of the members 1 and generally within the range of about 500° F. to 1250° F. The metal should also have good casting characteristics with a minimum amount of shrinkage on cooling so that the die will remain in intimate contact with the member 1 on solidifying.

Furthermore, the metal of die 5 should have a relatively good electrical conductivity so that the welding potential during flash welding may be applied directly to the cast die, thereby eliminating the use of copper conductor bars or plates.

The compressive strength of the die must be high enough so that the alloy will not deform under the impact of flash welding. Deformation of the die would result in a loss of welding tolerances.

The zinc alloy "Kirksite," having a composition of about 4% aluminum, 3% copper, 0.5% magnesium and the balance zinc, has proven very satisfactory for use as the die 5. "Kirksite" has a melting point of about 717° F.

Other metals such as lead, cadmium or zinc may be used for the die 5, and if the members 1 are fabricated from alloy steel, higher melting point metals such as magnesium or aluminum may be used for the die.

Figure 3:
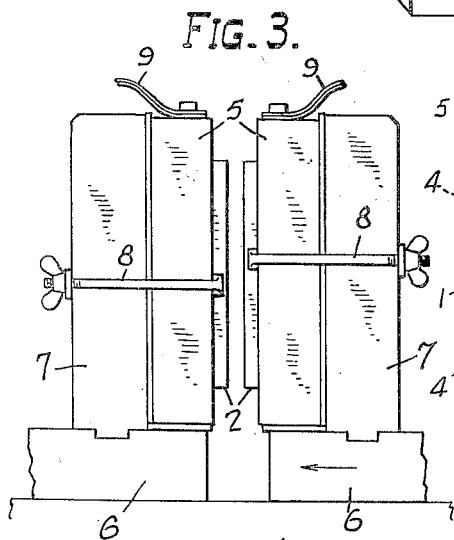
Fig. 3 is a side elevation showing the dies positioned in the flash welding assembly.

After the die 5 has hardened, the mold box 3 is removed and the die is employed during flash welding to rigidly hold the members during the impact of welding. The metal dies 5 are disposed on the flash weld assembly as shown in Fig. 3. The dies 5 are suitably mounted, in a spaced opposed relation, on platens 6 with one or both of the platens being adapted to move toward the other to bring the aligned edges 2 of the members 1 into contact.

To support the dies 5 during the impact of the pieces in the flash welding operation the dies are secured to backing blocks 7 by clamps 8. Blocks 7 are keyed to the respective platens 6. Welding potential from a source of potential, not shown, is applied to the dies 5 through leads 9.

As the welding potential is applied to the dies 5, the dies are moved toward each other until a flash arc is set up by the current passing between the opposed edges 2 of the members 1. Continued movement of the dies is governed in accordance with the flashing off of the metal at the edges 2, and when a sufficient heating of metal adjacent the edges is attained, the edges are abutted or bumped under pressure and the welding potential is discontinued. At the time of bumping of the opposed edges, the molten metal at the meeting faces of the edges 2 is extruded laterally from the joint as flash metal, indicated by 10 in Fig. 4.

Figure 4:
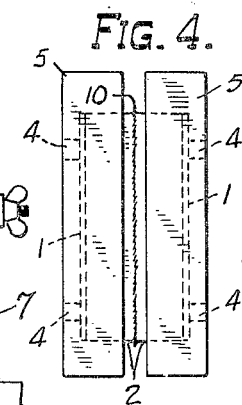
Fig. 4 is a side elevation of the welded members and the attached dies after removal from the flash welding assembly.
Figure 5:
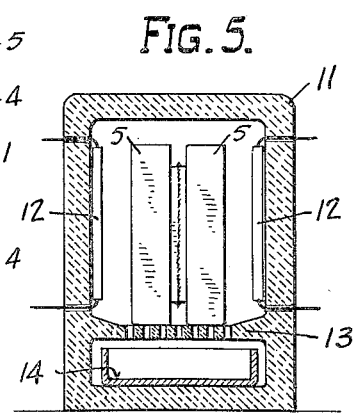
Fig. 5 is a vertical section of a furnace showing the welded members and the attached dies being heated to a temperature sufficient to melt the dies.
Figure 6:
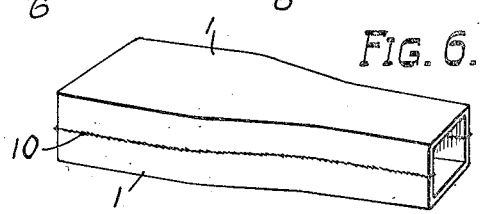
Fig. 6 is a perspective view of the welded member after removal of the dies.

After the welding has been completed, the leads are disconnected and the dies 5 are removed from the platen 6. The welded members with the attached dies are shown in Fig. 4.

The welded members 1 and the attached dies 5 are then placed in a furnace 11. The furnace may be heated in any conventional way. As shown in the drawing, the furnace 11 is heated by the electric elements 12. The welded members 1 and attached dies are placed on a perforated platform 13 which is spaced upwardly from the bottom of the furnace.

During the heating operation the metal dies 5 are melted away from the welded members 1 and the molten metal passes downwardly through the perforated platform 13 and is collected in pan 14. The metal collected in pan 14 may then be re-used as a casting for another member to be subsequently welded.

If the members 1 are of carbon steel, it is usually only necessary to heat the members to a temperature slightly above that of the melting point of the alloy of dies 5 in order that the alloy will be melted away from the welded members. However, if the members 1 are fabricated from high alloy steel, such as ASTM 4340, the heating operation in furnace 11 serves the dual purpose of stress relieving the welded area and also melting the alloy of dies 5 away from the members. To stress relieve the members 1, the members should be heated to a temperature above the melting point of the die 5 and within the range of about 900° F. to 1300° F. with the specific temperature determined to a great extent by the prior heat treatment of the steel prior to flash welding.

It is essential that the edges 2 be accurately aligned for the flash welding operation. This alignment can be achieved by accurately aligning the members 1 in the respective mold boxes 2 and then placing the alloy dies 5 in predetermined positions on the platen 6. Alternately, the edges 2 can be aligned by adjusting the position of the dies 5 on the platen 6 until the alignment is achieved.

The present method eliminates the costly operation of machining dies which are necessary to rigidly hold the pieces during flash welding. The machining of dies is an extremely expensive operation particularly when hollow pieces are to be welded and both an internal and external die is required in order to position the piece. The present method substantially reduces the cost of flash welding, particularly for testing operations or small production runs where the cost of machining of dies would make these operations prohibitive.

The present invention also provides an excellent fitting between the die and the piece to be welded so that there will be no relative movement therebetween during the impact of flash welding. Machined dies never fit the pieces perfectly for the pieces are never identical in contour. With the present invention the die is cast around the piece and extends on both the inside and the outside of the piece so that there is an excellent fitting between the two and there will be no loss of welding tolerances due to misfitting of the die and piece to be welded.

As it is contemplated that the cast die 5 be composed of a material having a relatively high electrical conductivity, no copper conductor plates or bars will be required to be attached to the die during the flash welding.

Although the invention has been described specifically with respect to flash welding the invention is also applicable to resistance butt welding.

Various modes of carrying out the invention are contemplated as within the scope of the following claims particularly pointing out and distinctly claiming the subject matter which is regarded as the invention.

We claim:

1. A method of fabricating a welded article from two metal parts having complementary edges to be welded comprising, positioning each of the parts within a separate container, introducing a low melting point metal into the container and casting the metal around the parts to form a die with the edges of the parts to be welded projecting outwardly of the surface of the die, positioning said dies to align said edges in opposed relation, applying an electrical potential to said parts while moving the dies relative to each other to bring said opposed edges into contact and weld the parts together, said dies serving to rigidly support the parts during the welding, and thereafter heating the welded article and attached dies to a temperature above the melting point of said dies and beneath the melting point of said article to melt the dies from the article.

2. A method of fabricating a welded article from two metal parts having complementary edges to be welded comprising, casting a metal having a melting point substantially below the melting point of the parts around each of the parts to form a die with the edges to be welded of each part projecting outwardly of the surface of the respective die, positioning the dies in spaced opposed relation with the edges of the respective parts being aligned, applying an electrical potential to said parts while moving the dies relative to each other to bring said opposed edges into contact and weld the parts together, and heating the welded article and attached dies to a temperature above the melting point of said dies and beneath the melting point of said article to melt the dies from the article.

3. A method of flash welding the complementary edges of two metal articles comprising, casting a metal having a melting point substantially below the melting point of the articles around each of the articles to form a die with the edges to be welded of each article projecting outwardly of the surface of the respective die, positioning the dies in spaced opposed relation with the edges of the respective articles being aligned, applying an electrical potential to said articles while moving the dies relative to each other to bring said opposed edges into contact and flash weld the articles together, and stress relieving the welded articles by heating the welded articles and attached dies to a temperature above the melting point of said dies and beneath the melting point of said articles to melt the dies from the articles.

4. A method of flash welding the complementary edges of two steel articles comprising, casting a fusible material having a melting point in the range of 500° F. to 1250° F. around each of the articles to form a die with the edges to be welded of each article projecting outwardly of the surface of the respective die, positioning the dies in spaced opposed relation with the edges of the respective articles being aligned, applying an electrical potential to said articles while moving the dies relative to each other to bring said opposed edges into contact and flash weld the articles together, and stress relieving the welded members by heating the members and the attached dies to a temperature above the melting point of said fusible material and within the range of 900° F. and 1300° F. with the dies being melted away from the members at said temperature.

5. A method of fabricating a flash welded article from two metal parts having complementary edges to be welded comprising positioning each of the parts within a separate molding container, casting a metal having a melting point substantially below the melting point of the parts around each of the parts to form a die with the edges to be welded of each part projecting outwardly of the surface of the respective die, positioning the dies in spaced opposed relation with the edges of the respective parts being aligned, flash welding the opposed edges of said parts together by applying an electrical potential to said dies while moving the dies relative to each other to bring said edges into contact, and raising the temperature of the welded article and the dies above the melting temperature of said dies and below the temperature which will deleteriously affect the article to melt the dies from the article.

6. A method of fabricating a weld article from two metal parts having complementary surfaces to be welded, comprising positioning each of the parts in a separate mold box, introducing a metal having a melting point in the range of 500° F. to 1250° F. into the mold box to a depth sufficient to permit the surfaces to be welded of the parts to project outwardly of the level of the material, hardening said material to form a die surrounding each of said parts, positioning the dies in spaced opposed relation with the surfaces to be welded being aligned, and applying an electrical potential to said dies while moving the dies relative to each other to bring said surfaces into contact and flash weld the articles together.

References Cited in the file of this patent

UNITED STATES PATENTS 1,490,191     Allcutt                 Apr. 15, 1924

FOREIGN PATENTS 581,802     Great Britain           Oct. 25, 1946